United States Patent Office 3,471,482
Patented Oct. 7, 1969

3,471,482
C-AMINOALKYLAMINOALKYLPHENOTHIAZINE DERIVATIVES
Blaine M. Sutton, Philadelphia, Pa., assignor to Smith Kline & French Laboratories, Philadelphia, Pa., a corporation of Pennsylvania
No Drawing. Filed Jan. 6, 1967, Ser. No. 607,643
Int. Cl. C07d 93/14; A61k 27/00
U.S. Cl. 260—243          9 Claims

ABSTRACT OF THE DISCLOSURE

C-aminoalkylaminoalkylphenothiazine derivatives optionally substituted in the benz-portion of the phenothiazine nucleus having anti-inflammatory activity. The compounds are usually prepared by reduction of the known N-aminoalkylphenothiazine carboxamide using lithium aluminum hydride-aluminum chloride.

---

This invention relates to novel chemical compounds having the basic structure of a C-aminoalkylaminoalkylphenothiazine plus pharmaceutical compositions have anti-inflammatory activity containing such compounds.

The new C-alkylated phenothiazines of this invention are illustrated by the following structural formula:

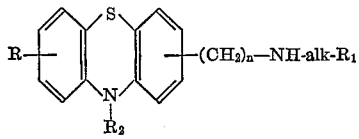

Formula I in which R represents one or more hydrogen, halo such as chloro, bromo or fluoro, lower alkoxy, lower alkyl, trifluoromethyl, trifluoromethoxy, trifluoromethylsulfonyl or trifluoromethylthio C-substituent in the phenothiazine nucleus, $R_1$ is a secondary or tertiary basic, nitrogen containing end group of not more than 12 carbon atoms such as dilower alkylamino, lower alkylamino, piperidinyl, pyrrolidinyl, morpholinyl, thiomorpholinyl, N-phenylpiperazinyl, N-hydroxyethylpiperazinyl, N-lower alkylpiperazinyl or N-methyl-C-piperidinyl; $R_2$ is lower alkyl or preferably hydrogen; $n$ is a lower positive integer such as 1 or 2; and alk is a straight or branched alkylene chain containing a maximum of 4 carbon atoms and at least 2 alkylene units separating the two chain nitrogen atoms.

Preferred compounds are those of Formula I in which R is trifluoromethyl, chloro, bromo, or fluoro; $R_1$ is dimethylamino, diethylamino, N-piperidinyl, N-hydroxyethylpiperazinyl, N-methylpiperazinyl or N-pyrrolidinyl; $R_2$ is hydrogen and alk is ethylene, isopropylene, propylene or 2-methylpropylene.

Also included in this invention are the nontoxic acid addition salts of the compounds of Formula I with pharmaceutically acceptable acids such as hydrochloric, sulfuric, maleic, sulfamic, pamoic, phosphoric, hydrobromic ethanedisulfonic, etc., acids. It will be recognized by one skilled in the art that one or more molar equivalents of acid may be used but, preferably, all the reactive basic centers of the claimed compounds are reacted with acid. Such salts are prepared by methods known to the art, for example, by using an excess or the desired equivalent of acid in a water immiscible organic solvent such as ether or chloroform or in a water immiscible solvent such as methanol, acetone or ethanol.

The compounds of this invention are most conveniently prepared by reduction of the corresponding carboxamide with an amide reducing agent, usually lithium aluminum hydride-aluminum chloride often in ether or tetrahydrofuran, at from about room temperature to about reflux temperature. The carboxamide starting materials are either known to the art or are prepared as described either in Example 1 or in my copending application, Ser. No. 551,562, filed May 20, 1966.

More precisely the carboxamide starting materials are prepared from the phenothiazine carboxylic acid or acetic acids by conversion to the acid chloride using an acyl halogenating agent in the presence of dimethylformamide such as phosphorous trichloride in chloroform then reaction of the acid chloride with a known ω-tertiary aminoalkylamine usually in ether at room temperature.

I have unexpectedly found that the use of a complex formed by the halogenating agent with dimethylformamide, for example the phosphorous trichloride-dimethylformamide complex, minimizes nuclear halogenation which occurs to a major degree when the halogenating agent is used under more conventional reaction conditions. This reaction is also an important aspect of this invention.

The new compounds of this invention may alternatively be prepared by reacting a phenothiazinyl alkylhalide preferably the chloride, which is prepared as described in my copending application mentioned hereabove, with the desired tertiaryaminoalkylamine usually in the presence of an acid-binding agent or large excess of amine in benzene, ether or toluene. This method is particularly useful in preparing the secondary amine derivatives.

The compounds described herein are novel and have utility as pharmacodynamic agents especially having anti-inflammatory activity. They also have central nervous system depressant activity, for example tranquilizing activity.

As an example of biosignificant anti-inflammatory activity of claimed compounds, a standard test procedure which evaluates the efficiency of agents to suppress granuloma production on implanted filter paper pellets impregnated with carrageenin in groups of male rats during b.i.d. subcutaneous administration of the agent over a six day period, gives the following data with a representative compound:

| Drug | No. of animals | Individual values | Mean dry wt. of granuloma |
|---|---|---|---|
| Phlogistic control | 7 | 25.8, 38.6, 34.4, 24.7, 39.2, 16.6, 19.6 | 27.7±10.1 |
| Phenylbutazone, 20 mg./kg. b.i.d. | 8 | 13.3, 21.1, 16.1, 20.2, 7.6, 16.4, 10.4, 13.6 | [1] 14.8±4.6 |
| 1-diethylaminoethylaminomethyl-8-trifluoromethylphenothiazine dihydrochloride | | | |
| 40 mg./kg. b.i.d. | 8 | 17.5, 15.7, 17.2, 10.5, 12.8, 11.6, 19.0, 11.8 | [1] 14.0±2.5 |
| 10 mg./kg. b.i.d. | 6 | 15.6, 19.4, 28.2, 17.8, 16.2, 13.3 | [1] 18.9±5.2 |

[1] Significant activity.

This compound in a companion test also showed activity at 5.0 mg./kg. of 14.9±4.1.*

The chemical compounds described above are used in the form of pharmaceutical dosage units, a capsule, tablet, troche, lozenge, sterile injectable preparation, syrup, stable solution or suspension for oral use. The dosage units may be of the single dosage type or of the sustained release type. The compounds are most often combined with a pharmaceutical carrier such as lactose, glyceryl monostearate, hydrogenated castor oil, sucrose, talc, pectin, peanut oil. The preparation of the product forms is standard to the art.

The dosage units containing an effective but non-toxic dose are then administered internally, preferably orally, to induce the pharmacodynamic activities described such as the preferred anti-inflammatory activity. Therefore, the pharmaceutical dosage unit forms containing an effective amount of the basic compounds of Formula I or \* Significant activity.

their pharmaceutically acceptable acid addition salts are an important part of this invention. As demonstrated above, activity has been shown at about 5–40 mg./kg.

It will be recognized that the nub of this invention is in the phenothiazine ring C-substituted with a secondary or tertiaryaminoalkylaminoalkyl side chain, that is a dibasic side chain. The side chain may be at any of the 1–4 positions but preferably at the 1-position for optimal anti-inflammatory activity. Also included as the oxidized forms of the compounds described such as the S-oxide or S-dioxide. These starting materials are described in my copending application. All these variations of this invention and others obvious to those skilled in the art having the basic configuration described are considered part of this invention.

The term lower alkyl or lower alkoxy denotes from 1–6, preferably 1–2 carbon atoms, branched or straight. Lower alkylene denotes 2–4 carbon atoms with at least 2 in the straight chain.

The following examples will illustrate the preparation of these compounds to enable one skilled in the art to practice this invention.

EXAMPLE 1

A solution of methyl 2-[2'-amino-4'-trifluoromethylphenylmercapto]-3-nitrobenzoate (10.6 g.) in 75 ml. of formic acid is stirred as 24 ml. of acetic anhydride is added dropwise. The reaction mixture is allowed to stand at room temperature overnight. The mixture is concentrated under reduced pressure to a residue which is taken up in 150 ml. of acetone then stirred with 120 ml. of ethanolic sodium hydroxide solution (1 N). After refluxing for one hour the acetone is removed and the residue extracted with ether.

The ether soluble material is dissolved in 75 ml. of warm ethanol. After 15 ml. of aqueous sodium hydroxide (40%) is added, the mixture is heated on a steam bath for one-half hour. After dilution with 200 ml. of distilled water and decolorizing with charcoal, the desired 8-trifluoromethylphenothiazine-1-carboxylic acid, M.P. 238–240° C. (d.) is separated by treatment of the solution with acetic acid.

One gram of the acid with 15 ml. of phosphorous trichloride, 15 ml. of chloroform and 1 ml. of dry dimethylformamide is stirred at room temperature for four hours. The solvent is removed and the residue recrystallized from hexane to give 8-trifluoromethylphenothiazine-1-carboxylic acid chloride, M.P. 125–127° C.

The acid chloride (5 g., 0.015 mole) in ether is added to an ethereal solution of 10 g. (0.075 mole) of freshly distilled diethylaminoethylamine. After standing over night, the mixture is washed with water. The ether layer is dried and treated with hydrogen chloride to give N-diethylaminoethyl - 8-trifluoromethylphenothiazine-1-carboxamide hydrochloride, M.P. 167–168° C.

A filtered solution of 13.3 g. (0.1 mole) of aluminum chloride in 100 ml. of ether is added to 4.0 g. (0.1 mole) of lithium aluminum hydride in 200 ml. of ether. The carboxamide (8 g., 0.018 mole) is converted to the free base by shaking in dilute sodium hydroxide solution and ether. The ether extracts are combined, dried, and added to the reduction mixture slowly with stirring. The mixture is heated at reflux for about 15 hours, then cooled and treated with water. The ethereal extracts are combined, then extracted with dilute hydrochloric acid. The acid extracts are neutralized and taken into ether. The dried ether extracts containing the free base are then evaporated to give the oily base, 1-diethylaminoalkylaminomethyl-8-trifluoromethylphenothiazine, or are treated with an excess of acid to give the acid addition salt. The dihydrochloride salt melts at 232–233° C.

EXAMPLE 2

Using the detailed method described above and the corresponding acid of my copending application, Ser. No. 551,562, filed May 20, 1966, together with the known diamine listed the following products are prepared:

| Phenothiazine acid | Diamine | Base | Salt |
| --- | --- | --- | --- |
| 8-chloro-1- | Dimethylaminopropylamine | 8-chloro-1-dimethylaminopropylaminomethylphenothiazine. | 2 HCl |
| 8-fluoro-1- | Pyrrolidinylpropylamine | 8-fluoro-1-pyrrolidinylpropylaminomethylphenothiazine. | 2 H$_2$SO$_4$ |
| 9-methyl-1- | Morpholinylethylamine | 9-methyl-1-morpholinylethylaminomethylphenothiazine. | 2 HCl |
| 7-trifluoromethoxy-1- | Dimethylaminoethylamine | 7-trifluoromethoxy-1-dimethylaminoethylaminomethylphenothiazine. | 2 HBr |
| 8-trifluoromethyl-sulfonyl-1- | Diethylaminoethylamine | 8-trifluoromethylsulfonyl-1-diethylaminoethylaminomethylphenothiazine. | |
| 8-chloro-7-methyl-1- | Piperidnylethylamine | 8-chloro-7-methyl-1-piperidinylethylaminomethylphenothiazine. | 2 HCl |
| 7-methoxy-1- | N-phenylpiperazinylethylamine | 7-methoxy-1-N-phenylpiperazinylethylaminomethylphenothiazine. | 2 HCl |
| 9-trifluoromethyl-1- | Dimethylamino-2'-methylpropylamine | 9-trifluoromethyl-1-dimethylamino-2'-methylpropylaminomethylphenothiazine. | |
| 8-trifluoromethyl-1-S-dioxide | Dimethylaminopropylamino | 8-trifluoromethyl-1-dimethylaminopropyl-aminomethylphenothiazine S-dioxide. | 2 HCl |
| 7,8-dimethoxy-1- | Diethylaminoethylamine | 7,8-dimethoxy-1-diethylaminoethylaminomethylphenothiazine. | H$_3$PO$_4$ |
| 7-methyl-10-methyl-3- | Dimethylaminoethylamine | 10-methyl-7-methyl-3-dimethylaminoethylaminomethylphenothiazine. | 2 HBr |
| 7,8-dimethyl-1- | N-methyl-3'-piperidinylmethylamine | 7,8-dimethyl-1-(N-methyl-3'-piperidinyl)-methylaminomethylphenothiazine. | 2 HCl |
| 8-trifluoromethyl-1- | N-methylpiperazinylpropylamine | 8-trifluoromethyl-1-(N-methylpiperazinyl)-propylaminomethylphenothiazine. | 3 HCl |
| 8-trifluoromethyl-1-CH$_2$CO$_2$H | Diethylaminoethylamine | 8-trifluoromethyl-1-diethylaminoethylamino-ethylphenothiazine. | 2 HBr |
| 8-trifluoromethyl-4- | Dimethylaminoethylamine | 8-trifluoromethyl-4-dimethylaminoethylaminomethylphenothiazine. | 2 HCl |
| 2-trifluoromethyl-9-methyl-1- | do | 2-trifluoromethyl-9-methyl-1-dimethylamino-ethylaminomethylphenothiazine. | 2 HBr |
| 2-methoxy-1- | Diethylaminoethylamine | 2-methoxy-1-diethylaminoethylaminomethylphenothiazine. | 2 HCl |

EXAMPLE 3

N-dimethylaminoethyl phenothiazine-2-carboxamide (4 g., U.S. Patent No. 3,112,309) in ether is added to a previously prepared aluminum chloride-lithium aluminum hydride ether reduction mixture. After heating at reflux for about 12 hours, the reaction mixture is hydrolyzed and worked up as in Example 1 to give 2-dimethylaminoethylaminomethylphenothiazine base and dihydrochloride salt.

EXAMPLE 4

A mixture of 3.2 g. (0.01 mole, copending Ser. No. 551,562) of 1 - chloromethyl-8-trifluoromethylphenothiazine and 2 g. of 2-(N-hydroxyethylpiperazinyl)-ethylamine in 75 ml. of ethanolic potassium hydroxide is heated at reflux for eight hours. The mixture is filtered and evaporated. The residue is washed well with water then extracted with ether. Acid extraction followed by neutralization and re-extraction into ether gives the base, 8 - trifluoromethyl - 1 - (N - hydroxyethylpiperazinyl)-ethylaminomethylphenothiazine.

Repeating this reaction with an excess of 3-(ethylamino) - propylamine gives 8 - trifluoromethyl - 1-ethylaminopropylaminomethylphenothiazine.

EXAMPLE 5

1 - diethylaminoethylaminomethyl - 8 - trifluoromethylphenothiazine (150 mg.) is mixed with 100 mg. of lactose and 5 mg. of magnesium stearate then filled into a hard gelatin capsule. Such capsules are administered 2–3 times daily to 75 kg. abnormal animal subjects to induce an anti-inflammatory or tranquilizing effect.

What is claimed is:

1. A basic chemical compound of the formula

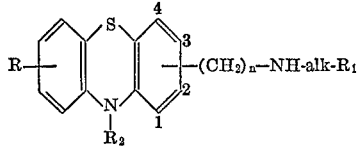

in which:

R is hydrogen or a halo, lower alkoxy, lower alkyl, trifluoromethyl, trifluoromethoxy, trifluoromethylsulfonyl, or trifluoromethylthio group when the $(CH_2)_n NHalkR_1$ group is at the 1 or 4-positions;

R is hydrogen or a halo, 7-lower alkyl, or a 7-lower alkoxy group when the $(CH_2)_n NHalkR_1$ group is at the 2-position;

R is hydrogen or 7-lower alkyl when the $(CH_2)_n NHalkR_1$ group is at the 3-position;

$R_1$ is dilower alkylamino, each alkyl group having 1–6 carbon atoms, lower alkylamino of 1–6 carbon atoms; piperidino, pyrrolidino, morpholino, thiomorpholino, 4 - phenylpiperazino, 4 - (2-hydroxyethyl) piperazino, 4-lower alkylpiperazino or 1-methyl-3-piperidinyl;

$R_2$ is lower alkyl or hydrogen;

$n$ is 1 when the $(CH_2)_n NHalkR_1$ group is at the 3-position, $n$ is 1 or 2 when the $(CH_2)_n NHalkR_1$ group is at the 1 or 4-position, and $n$ is 2 when the $(CH_2)_n NHalkR_1$ group is at the 2-position, except that $n$ can also be 1 when at the same time the $(CH_2)_n NHalkR_1$ group is at the 2-position and R is hydrogen; and alk is a branched or straight alkylene chain of from 2 to 4 carbon atoms which separates the two nitrogen atoms to which it is attached by at least 2 carbons or, when $R_1$ is 1-methyl-3-piperidinyl, methylene;

said lower alkyl and lower alkoxy groups having 1 or 2 carbon atoms; or its pharmaceutically acceptable acid addition salt with a nontoxic acid.

2. A compound of the formula in claim 1 in which R is 8-trifluoromethyl, $R_2$ is hydrogen and the dibasic side chain is in the 1 position.

3. A compound of the formula in claim 1 in which R is 8-halo, $R_2$ is hydrogen and the dibasic side chain is in the 1 position.

4. 8 - trifluoromethyl - 1 - diethylaminoethylaminomethylphenothiazine.

5. 8 - chloro - 1 - diethylaminoethylaminomethylphenothiazine.

6. A medicinal composition in dosage unit form containing a compound of the formula of claim 1, said composition having anti-inflammatory activity.

7. A medicinal composition in dosage unit form containing the compound of claim 4, said composition having anti-inflammatory activity.

8. A medicinal composition in dosage unit form containing the compound of claim 5, said composition having anti-inflammatory activity.

9. In the method of forming a phenothiazine carboxylic acid chloride of the formula

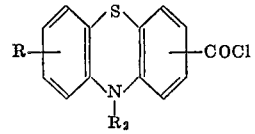

where R and $R_2$ are as defined in claim 1, from a phenothiazine-carboxylic acid of the formula

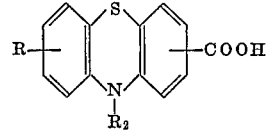

using phosphorus trichloride as the halogenating agent, the improvement comprising using a phosphorus trichloride dimethylformamide complex in chloroform as the halogenating agent at about room temperature.

References Cited

UNITED STATES PATENTS 3,112,309   11/1963   Cosic et al. _____ 260—243

HENRY R. JILES, Primary Examiner

H. I. MOATZ, Assistant Examiner

U.S. Cl. X.R.

424—247